July 11, 1967 G. RODERMUND ET AL 3,330,103
MACHINE FOR MANUFACTURING CHENILLE AND GARLANDS
Filed May 12, 1965 3 Sheets-Sheet 1
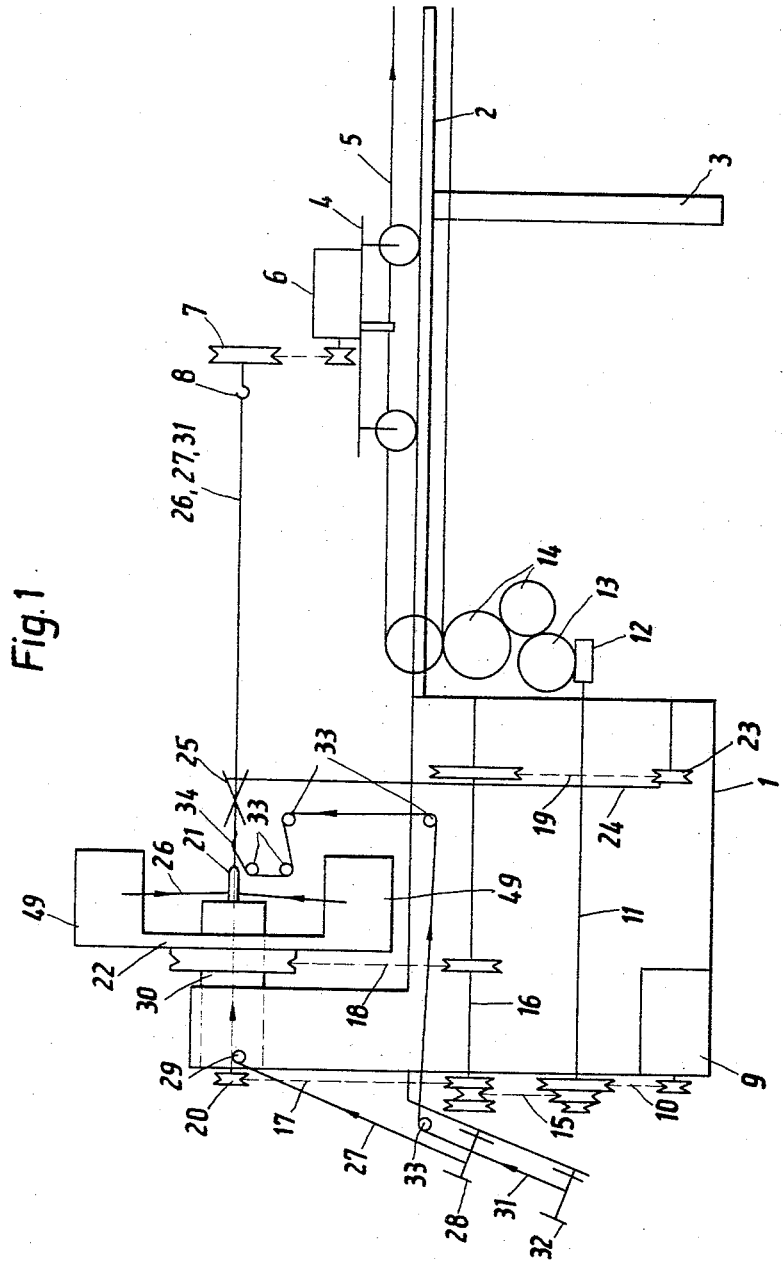
*Inventors*
Gerd Rodermund
Helmut Kappus
By Ernest F. Montague
*Attorney*

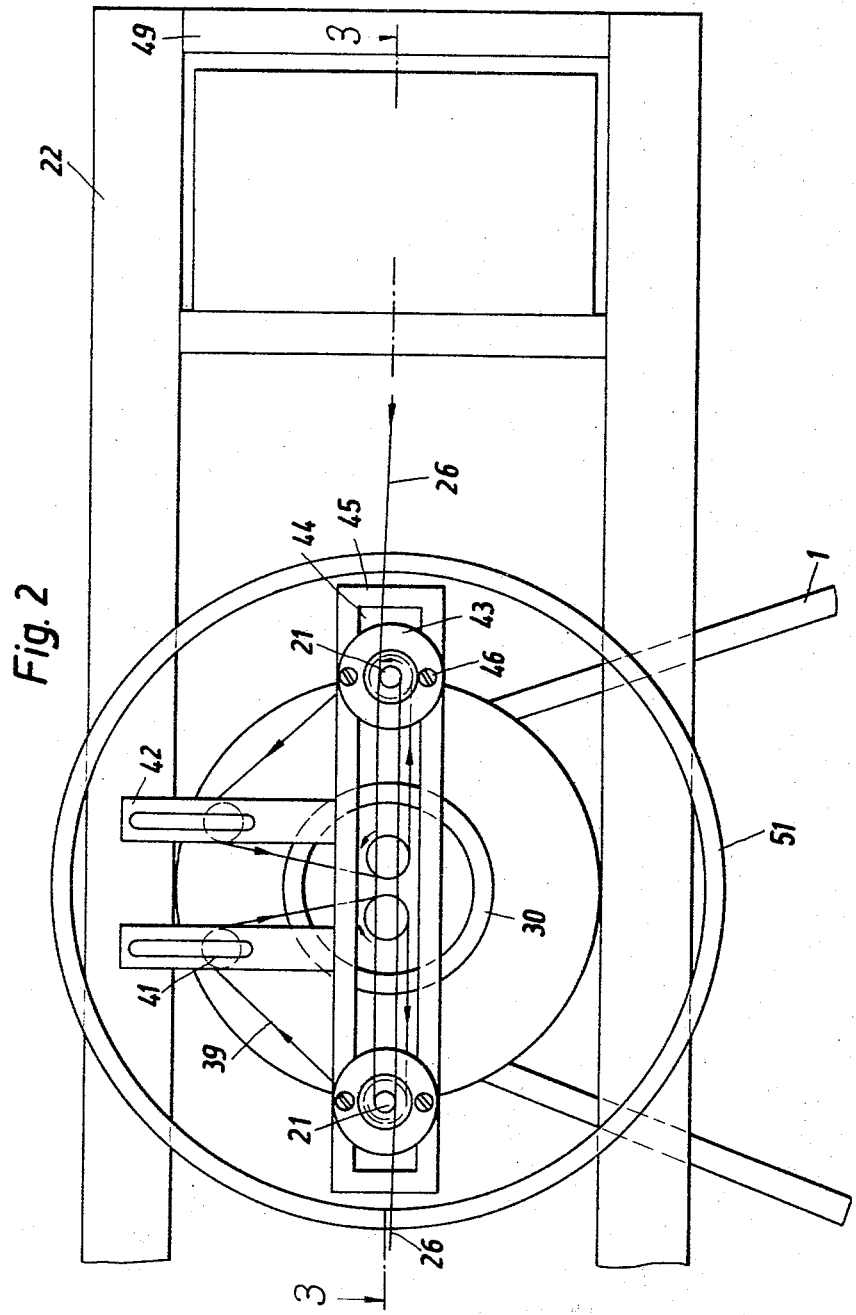

July 11, 1967  G. RODERMUND ET AL  3,330,103
MACHINE FOR MANUFACTURING CHENILLE AND GARLANDS
Filed May 12, 1965  3 Sheets-Sheet 3
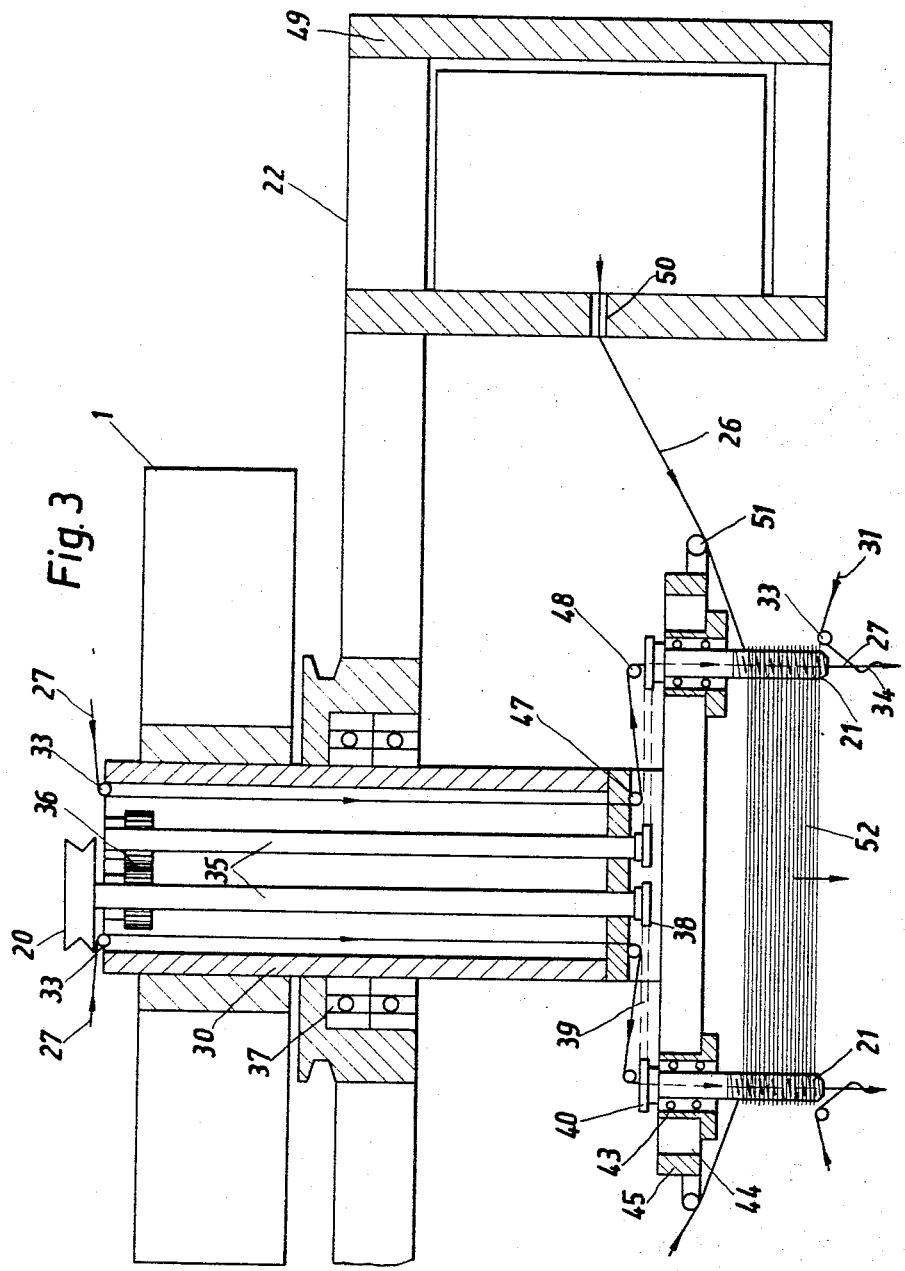
Inventors
Gerd Rodermund
Helmut Kappus
BY
Attorney

United States Patent Office 3,330,103
Patented July 11, 1967

3,330,103
MACHINE FOR MANUFACTURING CHENILLE AND GARLANDS
Gerd Rodermund, In der Breite 24, Lahr, Germany, and Helmut Kappus, Lahr, Germany; said Kappus assignor to said Rodermund
Filed May 12, 1965, Ser. No. 455,142
Claims priority, application Germany, May 12, 1964, R 37,877
5 Claims. (Cl. 57—24)

The present invention relates to a machine for manufacturing chenille and garlands.

Machines for manufacturing chenille and garlands are already known which comprise a device for producing a tube from filamentary or band-shaped winding material using two parallel pairs of wires or threads, each of which consists of a core wire or thread extending through the tube and an outer wire or thread, and a device for twisting the pairs of wires or threads around sections of the winding material, which are formed by cutting open the tube and for drawing off the pairs of wires or threads.

In such machines, the winding material for producing the tube is wound directly on the parallel-running core wires. During the drawing-off operation the core wires carry the tube with them and deliver it to a cutting device. Subsequently, the core wires are twisted together with the outer wires or thread. Thus, the core wires serve at the same time as conveying means for the tube.

In the case of very thin silk or similar threads, which are usually employed for manufacturing chenille or garlands, no fundamental difficulties occur in this process. If coarser or very smooth winding material is to be employed, however, the wound-on tube is not carried along by the core wires, so that the manufacture of chenille or garlands from this material by means of the known machines has not been possible heretofore.

It is one object of the present invention to provide a machine for manufacturing chenille and garlands, which overcomes these difficulties.

It is another object of the present invention to provide a machine for manufacturing chenille and garlands, which is capable of processing such materials.

It is still another object of the present invention to provide a machine for manufacturing chenille and garlands, which starts from a machine of the known kind for manufacturing chenille and garlands and proposes to provide two conveyor screws which, having opposite threads, are arranged at a distance from one another and are driven at the same speed in opposite directions, and on which the winding material is wound and the conveyer screws lead each core wire or thread through a bore extending in the longitudinal direction through one of the conveyor screws.

It is still another object of the present invention to provide a machine for manufacturing chenille and garlands, wherein by means of the conveyor screws, the wound-on tube is positively advanced onto the core wires or threads led through the bores of the screws and is thereby also positively delivered to the cutting device. Thus, the core wires no longer serve for conveying the tube made of the winding material, but only constitute a guide for the tube.

It is still a further object of the present invention to provide a machine for manufacturing chenille and garlands, wherein the core wires are no longer stressed by the winding on the tube. On the contrary, the tube slides off loosely onto the core wires after being wound onto the conveyor screws and the latter take up the entire tension of the winding material, which tension can be adjusted as desired. The core wires can therefore be chosen independently of the tension required or desired in the winding of the material employed. The tension of the core wires can likewise be adjusted as desired according to the tension required during the twisting and draw-off of the special winding material, and the tension required according to the desired form of the chenille or the garlands.

The fact that the core wires or threads, which in the interests of as great a flexibility of the chenille or garlands as possible, must not be too thick, cannot withstand with a reasonable initial tension the strain, when a tube consisting of stiffer or thicker material is wound on, has heretofore prevented the manufacture of chenille or garlands from such material.

Because of the difficulties described, it has only been possible heretofore to produce chenille or garlands with a maximum diameter of about 80 mm. from very fine silk or similar threads. Apart from the restriction as regards the winding material employed, the limitation as regards this maximum diameter is also removed by the invention. Garlands with a diameter of 500 mm. or more can now be produced.

It is also a further object of the present invention to provide a machine for manufacturing chenille and garlands, wherein the conveyor screws are mounted in a longitudinal slot of a plate, in which they can slide for the purpose of adjusting their mutual distance from one another. In this way, the diameter of the chenille or the garlands can be adjusted in a convenient and simple manner.

It is still a further object of the present invention to provide a machine for manufacturing chenille and garlands, wherein it is moreover advantageous to drive each conveyor screw by means of a chain which runs over a sprocket wheel of a driving shaft, the sprocket wheel of the conveyor screw and a tensioning wheel. In this case, the easy sliding adjustment of the conveyor screws is not impeded by the drive required for them, because the tensioning wheel compensates the variable distance between the driving shaft, and the conveyor screw.

It is yet a further object of the present invention to provide a machine for manufacturing chenille and garlands, wherein for the purpose of adaptation to the different conditions obtaining in the manufacture of various types of chenille or garlands, it is moreover advantageous that the speed of the conveyor screws be variable.

It is also an object of the present invention to provide a machine for manufacturing chenille and garlands, wherein as a further development, a pair of scissors is arranged for cutting the tube open between the conveyor screws and in front of them in the direction of conveyance, the cutting surfaces of the scissors being covered with hard metal. Otherwise, in the working up of glass silk for example as winding material, the operation of the scissors would very soon be jeopardized.

There are several possibilities available for drawing off and twisting the pairs of wires or threads.

It is, however, also an object of the present invention to provide a machine for manufacturing chenille and garlands, wherein, however, it is advantageous, that a carriage running along a draw-off track and having two twisting heads driven by means of a motor and an infinitely variable belt drive be employed for the purpose.

It is yet also an object of the present invention to provide a machine for manufacturing chenille and garlands, wherein in addition to the manufacture of chenille or garlands, the machine also renders possible the manufacture of round brushes from synthetic or natural fibres. Because of the above-described difficulties, the continuous manufacture of such brushes has not been possible on machines of the type mentioned which have heretofore been known.

In particular, it is possible to produce garlands from glass silk filaments by means of a machine according to the present invention. In addition, it is also possible, for example, to use as winding material filaments of plastics, synthetic or natural bast, bast or cotton strips or tapes, sisal string, plastics tubes, for example the raw material for drinking straws, or even metal filaments.

With these and other objects in view which will become apparent in the following detailed description, the present invention will be clearly understood in connection with the accompanying drawings, wherein:

FIGURE 1 is a schematic side elevation of a machine designed in accordance with the present invention;

FIG. 2 is a fragmentary end view of the machine, as disclosed in FIG. 1; and

FIG. 3 is a section along the lines 3—3 of FIG. 2.

Referring now to the drawings and in particular to FIG. 1, the machine, designed in accordance with the present invention, comprises a frame 1 which may consist, for example, of profiled bars, receives the individual component parts of the machine.

Extending from the frame 1 is a draw-off track 2 with supports 3. A carriage 4, operated, for example, by a chain 5 runs on the draw-off track 2. Arranged on the carriage 4 is a motor 6 supplied with electric current by means of a flexible lead (not shown). The motor 6 drives twisting head 8 by way of belt drive 7, the transmission ratio of which is gradually adjustable by changing the pulley diameter. For example, simple hooks to which the core filaments and the outer filaments are attached can be used for the twisting heads 8.

A motor 9 is arranged in the frame 1 which motor 9 drives an intermediate shaft 11 by way of a belt drive 10 disposed at one end of the shaft 11. The other end of the intermediate shaft 11 drives through a worm wheel 13 and worm 12 and an intermediate gearing 14 the chain 5 for the draw-off movement of the carriage 4. Another belt drive 15, having a stepwise variable transmission ratio, leads from the intermediate shaft 11 to a second intermediate shaft 16. The last-mentioned shaft 16 drives by way of the belt drives 17, 18 and 19 a belt pulley 20 for the power transmission to the conveyor screws 21, a winding frame 22, and an eccentric wheel 23. A steel wire 24 leads from the eccentric wheel to scissors 25, which cut open the flat tube consisting of the winding material 26. The opening of the scissors 25 is effected by means of a suitable spring (not shown).

The core wires or threads 27 are withdrawn from bobbins 28, run over guide rollers 29, then through a bearing tube 30 of the winding frame 22, and then pass through the conveyor screws 21 to the twisting heads 8. The outer wires 31 run from their supply bobbins 32 over suitably arranged guide rollers 33 to the core wires 27 and are twisted together with them at the point 34.

Referring now again to the drawing and in particular to FIG. 2, which is an enlarged partial view of one embodiment of the present invention seen in the direction of the conveyor screws 21, while FIG. 3 is a section along the lines 3—3 extending axially through the two conveyor screws 21.

The conveyor screws 21 are driven by means of two shafts 35. One of the shafts 35 is driven by the belt pulley 20 and turns the other of the shafts 35 in the opposite direction by way of a toothed-wheel gearing 36. The shafts 35 extend through the bearing tube 30 for the winding frame 22, which is mounted on the tube 30 by means of a ball bearing 37. Mounted on the shafts 35 at the front end thereof with respect to the drawing-off direction are sprocket wheels 38, which, respectively, drive the sprocket wheels 40, of the conveyor screws 21 by means of chains 39. The chains 39, moveover, run over the tensioning wheels 41 (FIG. 2) mounted adjustably in slotted arms or brackets 42.

The bearings 43 of the conveyor screws 21 are movable in a longitudinal slot 44 of a plate 45 and can be fixed in position by means of screws 46. In this way, the distance between the conveyor screws 21 and, thereby, the diameter of the chenille or garland can be rapidly and conveniently adjusted.

After the core wires 27 leave the bearing tube 30, they run over guide rollers 47 and 48 and then pass through central bores (not shown) in the conveyor screws 21 to the twisting heads 8.

As has already been explained, the outer wires 31 are supplied by way of guide rollers 33 and are twisted together with the core wires 27 at the point 34.

The winding material 26 is drawn off from supply bobbins or spools which are arranged in cages 49 in the winding frame 22. Disposed at the exit opening 50 is a suitable braking device (not shown) which permits any desired initial tension of the winding material 26. After the winding material 26 has left the braking device, it slides over a deflecting ring 51 and is wound on the conveyor screws 21 to form a flat tube.

The conveyor screws 21 cause the tube 52 to move off the screws 21 and towards the scissors 25 (FIG. 1). Owing to the opposite directions of rotation of the conveyor screws 21 and the correspondingly opposite threads of the screws 21, it is ensured that the tube 52 does not take part on the rotary movement of the screws. After the tube 52 has been cut open, the fibres formed and consisting of the winding material 26 are bound in between the core filaments and outer filaments 27 and 31 respectively, and are secured in position by twisting.

The core 27 and outer wires 31 or threads can be selected according to the winding material employed and the desired form and strength of the chenille or garlands. It may be expedient that they consist in each case of a plurality of wires or threads or of combinations of the latter. In particular, plastics filaments or combinations thereof with metallic wires may also be especially advantageous.

As has already been explained, the winding material 26 may consist of any desired filaments or threads, and in fact also of stiff and smooth filaments or threads. For example, glass silk can be processed very satisfactorily. It is also not necessary to wind two like threads 26 on the conveyor screws. Moreover, the winding frame 22 can also be equipped with several cages 49.

While we have disclosed one embodiment of the present invention, it is to be understood that this embodiment is given by example only and not in a limiting sense, the scope of the present invention being determined by the objects and the claims.

What we claim as new and desire to secure by Letters Patent of the United States is:

1. A machine for manufacturing chenille and garlands, comprising
   a device for producing a tube from filamentary winding material using two parallel pairs of thread,
   each of said pairs of thread consisting of a core wire extending through said tube and an outer wire, and means for twisting said pairs of thread around sections of said winding material,
   said sections being formed by cutting means to open said tube, and means for drawing off said pairs of thread,
   said device including two conveyor screws with opposite threads arranged at a distance from each other,
   means for driving said conveyor screws at the same speed in opposite directions and winding said winding material thereon, and
   said conveyor screws having an axially disposed bore, and
   said core wire being led through said bores of said conveyor screws.

2. The machine, as set forth in claim 1, which includes a plate having a longitudinal slot, and
   said conveyor screws are mounted in the longitudinal slot of said plate and are slidable in said slot for the purpose of adjusting the distance between said conveyor screws.

3. The machine, as set forth in claim 1, wherein said means for driving said conveyor screws comprises a chain, a first sprocket wheel, a driving shaft, a second sprocket wheel mounted on each of said conveyor screws, and a tensioning wheel, and said chain runs over said first sprocket wheel mounted on said driving shaft, over said second sprocket wheel and over said tensioning wheel.

4. The machine, as set forth in claim 1, which includes a pair of scissors disposed between said conveyor screws and in front of the latter in the direction of conveyance and adapted for cutting open a tube, and the cutting surfaces of said scissors being covered with hard metal.

5. The machine, as set forth in claim 1, wherein said means for twisting said pairs of wires and for drawing off said pairs of threads, comprises a carriage, a draw-off track, said carriage running along said draw-off track, a motor mounted on said carriage, two twisting heads receiving said wires and threads, respectively, and means for rotating said twisting head operated by said motor.

References Cited

UNITED STATES PATENTS

| | | | |
|---|---|---|---|
| 817,965 | 4/1906 | Eversman | 57—24 |
| 1,558,179 | 10/1925 | Keefer | 57—24 |
| 1,927,292 | 9/1933 | Neff et al. | 57—24 |
| 2,408,898 | 10/1946 | Wilmsen | 57—24 |
| 2,551,986 | 5/1951 | Weller | 57—24 |
| 2,576,430 | 11/1951 | Weller | 57—24 |
| 3,109,277 | 11/1963 | Raymond et al. | 57—24 |

FRANK J. COHEN, *Primary Examiner.*

D. E. WATKINS, *Assistant Examiner.*